July 14, 1959 T. J. KEARNEY 2,894,484
APPARATUS AND METHOD FOR FLUID TREATMENT
OF METALLIC SLUGS OR THE LIKE
Filed Oct. 1, 1956 10 Sheets-Sheet 1

INVENTOR:
Thomas J. Kearney,
BY
ATTORNEYS

July 14, 1959

T. J. KEARNEY

2,894,484

APPARATUS AND METHOD FOR FLUID TREATMENT
OF METALLIC SLUGS OR THE LIKE

Filed Oct. 1, 1956

FIG_15_

FIG_16_

FIG_23_

INVENTOR:
Thomas J. Kearney,
BY
ATTORNEYS

United States Patent Office 2,894,484
Patented July 14, 1959

2,894,484

APPARATUS AND METHOD FOR FLUID TREATMENT OF METALLIC SLUGS OR THE LIKE

Thomas J. Kearney, Detroit, Mich., assignor to Detrex Chemical Industries, Inc., Detroit, Mich., a corporation of Michigan Application October 1, 1956, Serial No. 613,018

8 Claims. (Cl. 118—58)

This invention relates to apparatus and method for fluid treatment of metallic slugs or the like, and more particularly concerns treatment of a steel slug so that it may subsequently be subjected to cold shaping, the heavy plastic deformation of low carbon steels, by such processes as extruding, drawing, coining and cold forging.

To prepare properly a steel slug for cold shaping it must be cleaned and have placed thereon phosphate and lubricant coatings. It has long been desired to so coat the slugs on a mass production basis in keeping with present trends of automation. Attempts to use modifications of conventional barrel plating equipment have proved unsuccessful. Batch systems, of course, have become impractical in view of the high production rate required on many items.

The slugs have been cut from base metal and are covered with oil or lubricant from this operation, and this oil or lubricant must be removed before the slug can be properly prepared for cold shaping.

It is accordingly an object of this invention to provide apparatus and method for overcoming the above mentioned disadvantages and difficulties. It is another object of this invention to provide apparatus and method for preparing slugs for cold working which is automatic, efficient, and adapted for mass production. It is another object of this invention to prepare slugs for cold working without damaging these slugs and to prepare a large number of slugs within a short period of time.

Other objects and advantages of the invention will further become apparent hereinafter and in the drawings in which.

Although specific terms are used in the following description for the sake of clarity, these terms are intended to refer only to the structure shown in the drawings and are not intended to define or limit the scope of the invention.

Figure 1:
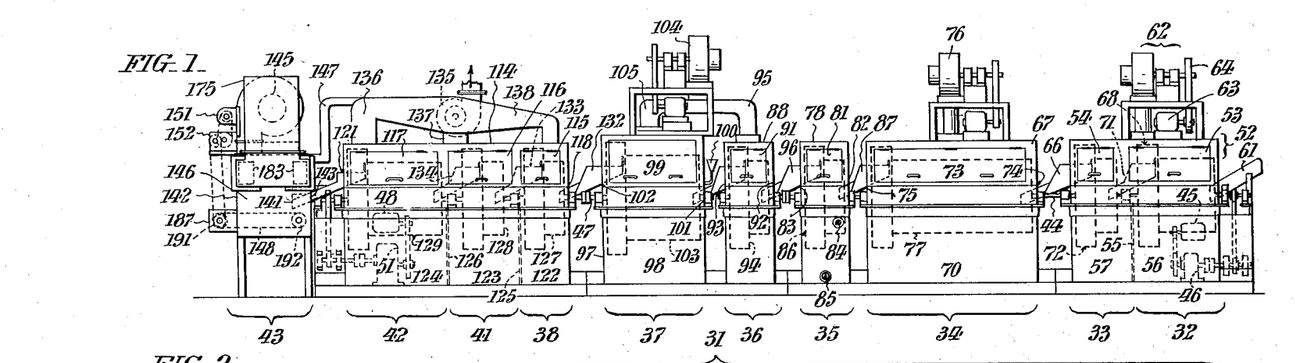
Fig. 1 represents a view in front elevation of the apparatus constructed in accordance with the invention and having wash, first hot rinse, pickling, first cold rinse, second hot rinse, phosphate coating, second cold rinse, third hot rinse, lubricating, and drying units.
Figures 2, 3:
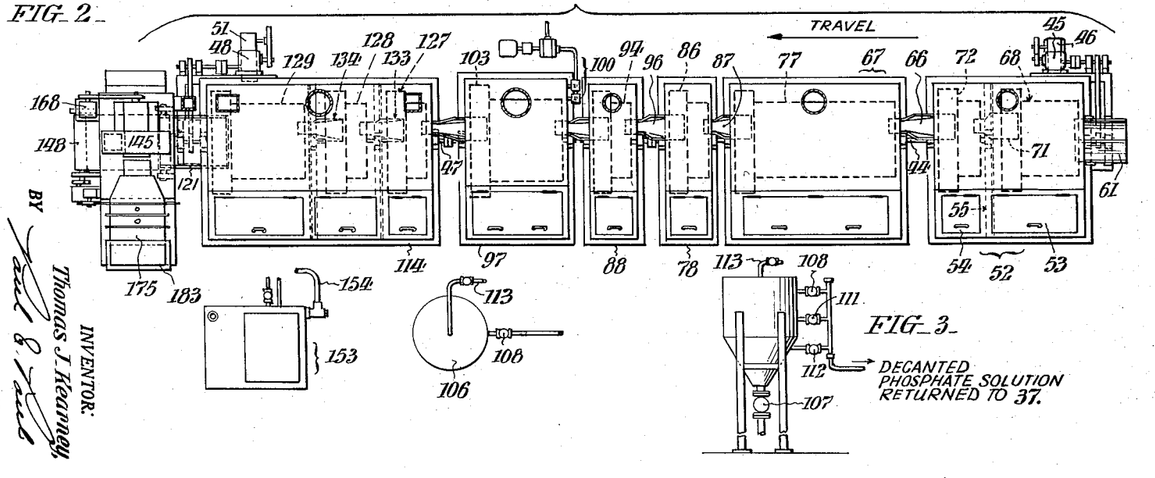
Fig. 2 represents a plan view of the apparatus of Fig. 1 with several blower units having been removed from the top of the apparatus.
Fig. 3 represents a view in side elevation of a sludge tank that is connected to the phosphate coating unit of Fig. 1.

Turning now to the specific embodiment of the invention selected for illustration, the number 31 designates generally apparatus for fluid treatment of metallic slugs including a hot detergent wash unit 32, a first hot rinse unit 33, a sulphuric acid pickling unit 34, a first cold rinse unit 35, a second hot rinse unit 36, a phosphate coating unit 37, a second cold rinse unit 38, a third hot rinse unit 41, a lubricating unit 42 and a drying unit 43. Units 32 through 36 are provided with a common drive shaft 44 which is driven by a motor 45 through reduction gearing 46 and associated drive mechanism. Similarly, units 37 through 42 are provided with a common drive shaft 47 which is driven by a motor 48, reduction gearing 51 and associated drive mechanism.

Units 32 and 33 are provided with an enclosure 52, having inspection doors 53, 54, which is separated interiorly by an overflow dam 55 into a wash tank 56 and rinse tank 57. An opening 58 is provided at the end of enclosure 52 in which is positioned a loading chute 61. Mounted on top of enclosure 52 is an exhaust blower mechanism 62 which includes motor 63 and belt drive 64. At its delivery end, enclosure 52 is provided with another opening in which is positioned a transfer chute 66 that connects with enclosure 67 of pickling unit 34. Positioned within enclosure 52 and mounted on shaft 44 is a rotating drum 68. A transfer chute 71 extends between drum 68 and another drum 72.

Pickling unit 34 is provided with the enclosure 67 forming a tank 70 and having an inspection door 73 and loading and delivery openings located at 74, 75. An exhaust blower mechanism 76 is mounted on top of enclosure 67 and a drum 77 is mounted on shaft 44 within the enclosure. The first cold rinse unit 35 is provided with an enclosure 78 having inspection door 81, loading opening and delivery openings at 82 and 83, overflow pipe 84, drain 85 and drum 86. A transfer chute 87 extends between units 34 and 35.

Second hot rinse unit 36 is provided with an enclosure 88 having an inspection door 91 and loading opening at 92, a delivery opening at 93, a drum 94 mounted within the enclosure and an exhaust conduit 95 extending from the top of the enclosure. Transfer chute 96 extends between units 35 and 36.

Phosphate coating unit 37 is provided with an enclosure 97 that forms a tank 98 and includes an inspection door 99, loading opening at 101, and delivery opening at 102. Also provided is a chemical feeder device 100 which is fixed to the side of enclosure 37 and which includes chemical pump and motor as indicated in Fig. 2. Drum 103 is mounted within the enclosure and an exhaust blower mechanism 104 is mounted on top of enclosure 97. The exhaust blower mechanism 104 has an exhaust conduit 105 that is mounted on the top of enclosure 97 and connects with exhaust conduit 95 that is mounted on the top of enclosure 88 of second hot rinse unit 36. A sludge tank 106 (Figs. 2 and 3) having a drain valve 107, decanting control valves 108, 111 and 112 and pipe 113 is connected to return piping to tank 98 as is hereinafter more fully described.

Units 38, 41 and 42 are provided with an enclosure 114 having inspection doors 115, 116 and 117, loading opening at 118, delivery opening at 121, and tanks 122, 123 and 124 formed therein by overflow dams 125 and 126. A drum 127 is positioned within tank 122, a drum 128 within tank 123, and a drum 129 within tank 124. Enclosure 97 is connected to enclosure 114 by transfer chute 132 and a transfer chute 133 extends between drums 127 and 128, while transfer chute 134 extends between drums 128 and 129. Mounted on top of enclosure 114 is exhaust blower 135 having exhaust conduit 136 extending into tank 124, conduit 137 extending into tank 123, and conduit 138 extending into tank 122. Transfer chute 141 extends between enclosure 114 and enclosure 142 of drying unit 43.

In drying unit 43, enclosure 142 has a loading opening at 143, a delivery opening 144, and has mounted on top of the enclosure a dryoff blower 145 that connects with a tank 146 within enclosure 142 and also connects with conduit 136 by means of exhaust conduit 147. Mounted within tank 142 is an open mesh conveyor belt 148 which is driven by motor 151, reduction gearing 152 and associated drive mechanism.

As is shown in Fig. 3 a lube mixing tank 153 having a pipe 154 is connected to tank 124.

Figure 4:
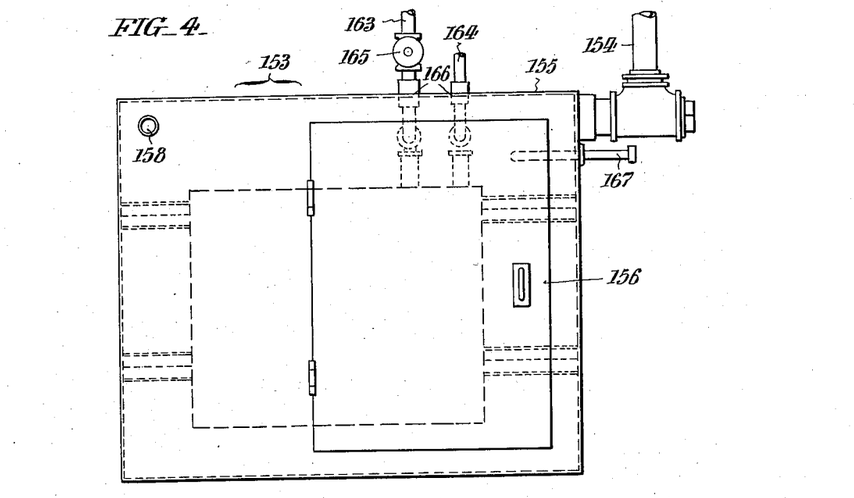
Fig. 4 represents a plan view of a lubrication mixing tank and Fig. 5 represents the lubrication mixing tank in vertical section, which tank is connected to the lubricating unit of Fig. 1.
Figure 5:
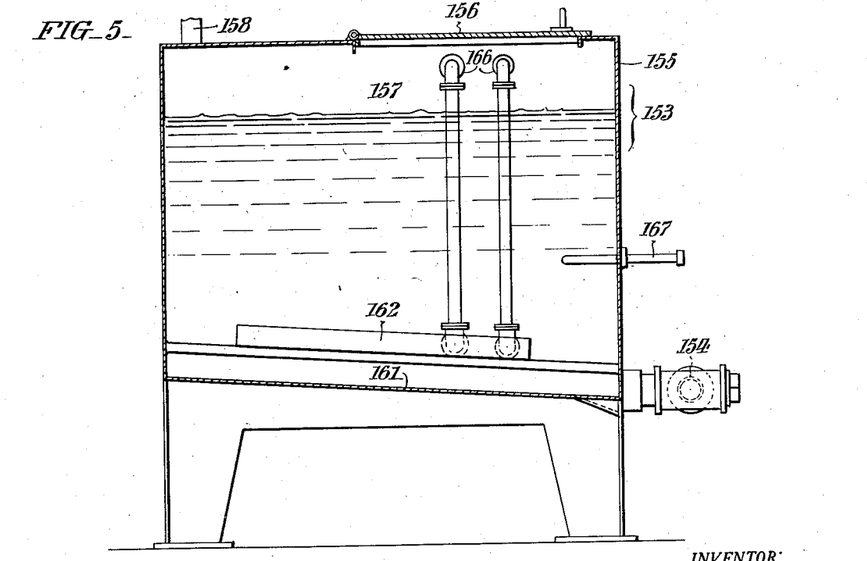

Referring to Figs. 4 and 5, which are enlarged views in greater detail of lube mixing tank 153, the number 155 denotes an enclosure having an access door 156 and forming a tank 157 for a lubricating fluid. Pipe 154 extends from the side of enclosure 155 at its bottom portion to a pumping system of tank 124 as is hereinafter more fully described. At the top of enclosure 155 is provided a filling pipe 158, and located on the bottom 161 of tank 157 is a heating coil plate 162 which is connected to steam inlet pipe 163 and steam outlet pipe 164. Inlet pipe 163 has positioned therein a valve 165, and pipes 163, 164 extend through enclosure 155 through apertures 166. A thermometer 167 is mounted in the side of enclosure 155.

Figure 6:
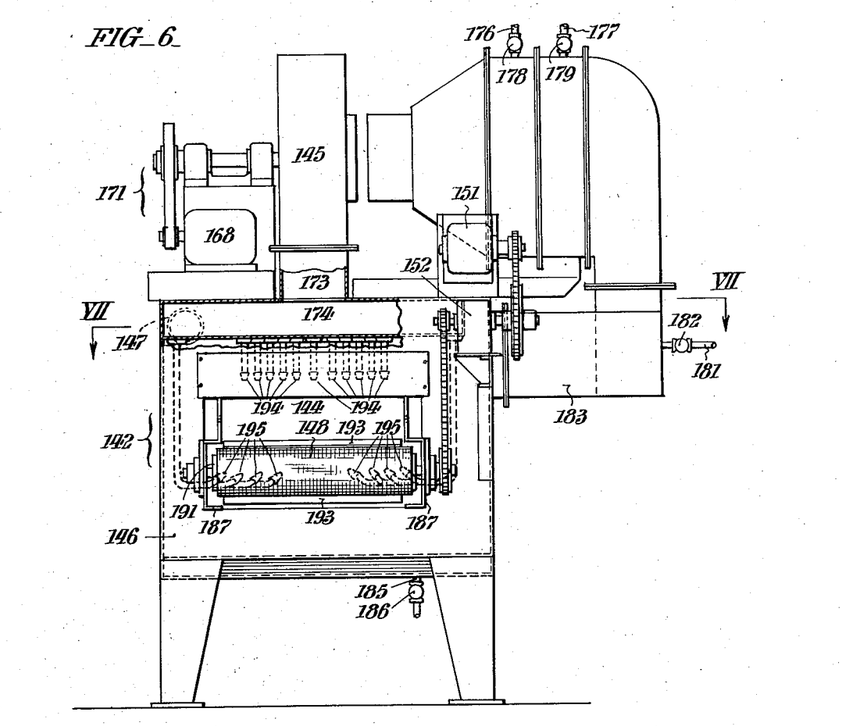
Fig. 6 represents an end view of the drying unit of Fig. 1.
Figure 7:
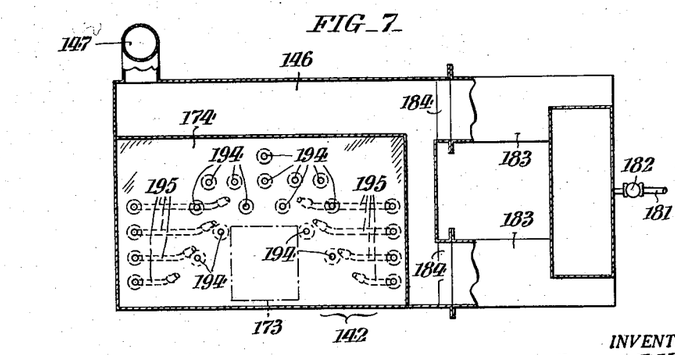
Fig. 7 represents a horizontal sectional view taken as indicated by the lines and arrows VII—VII which appear in Fig. 6.

Referring to Figs. 6 and 7, which show views of drying unit 43 on an enlarged scale and with parts broken away to illustrate important details, dry off blower 145 is mounted on top of enclosure 142 and includes motor 168 and belt drive 171. Opening 173 is provided between blower 145 and a blower chamber 174 located in the top of tank 146. Also mounted on enclosure 142 are steam heated finned tubes, air heating elements and a steam inlet pipe 176 and 177, with valves 178 and 179, each having a steam outlet pipe 181, and steam trap 182. The horizontal air conduits 183 of reduced cross section pass the heated air into tank 146 through openings 184. A drain 185, and valve 186, is provided at the bottom of tank 146.

Within tank 146 a pair of brackets 187 are arranged which extend from enclosure 142 to support drive roll 191 of conveyor belt 148. Idler roll 192 (Fig. 1) is mounted at the other end of enclosure. Open mesh conveyor belt 148 has affixed thereto a number of belt pusher angles 193 which extend across the outer surface of the belt. Angles 193 are positioned transverse to the direction of belt travel and form barriers which move the slugs along and help in moving the material forward during the dryoff. Extending downwardly from blower chamber 174 are a series of upper nozzles 194, which are positioned above belt 148, through which air is directed to the slugs on top of the belt for drying purposes. Also extending from blower chamber 174 are a series of lower nozzles 195 which have their ends positioned within the upper and lower courses of belt 148 and with their ends pointed upwardly to direct air against the under surface of the slugs through the mesh material of belt 148.

Figure 8:
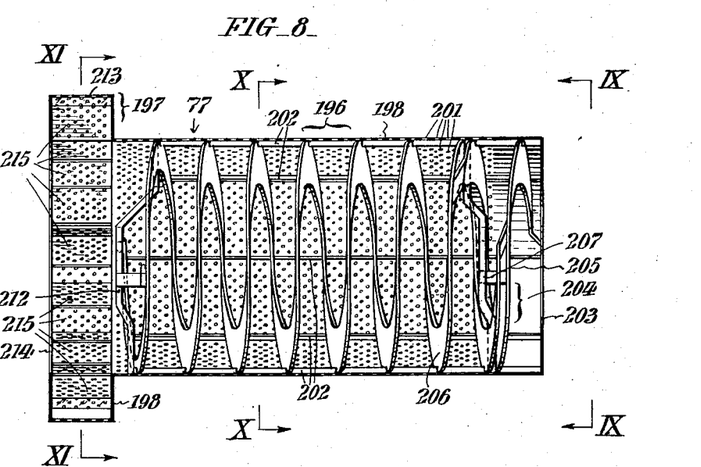
Fig. 8 represents a view in longitudinal vertical section of a drum used in the pickling unit of Fig. 1.
Figure 9:
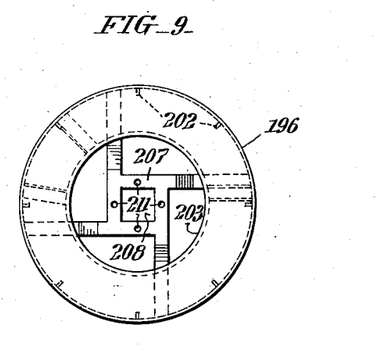
Fig. 9 represents an end view taken as indicated by the lines and arrows IX—IX which appear in Fig. 8.
Figure 10:
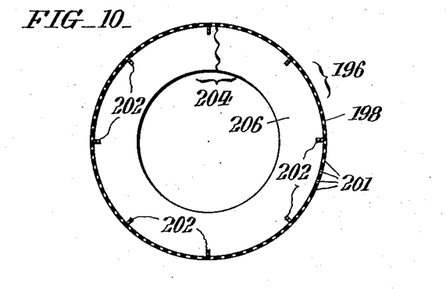
Figs. 10 and 11 represent views in cross section taken as indicated by the lines and arrows X—X and XI—XI, respectively, which appear in Fig. 8.
Figure 11:
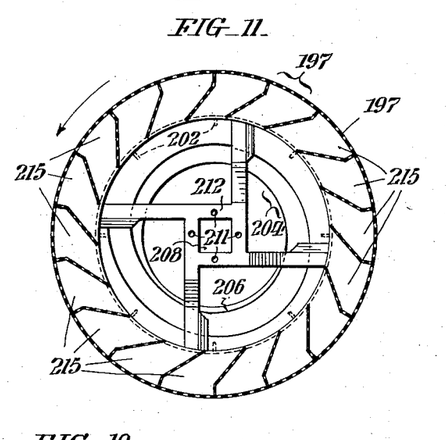

Referring now to Figs. 8, 9, 10 and 11 which show various views of pickling drum 77, the drum including an end portion 196 of small diameter and an end portion 197 of larger diameter. The drum wall 198 of the small portion 196 is provided with perforations 201 over much of its area and has mounted on the interior surface thereof a number of lifters 202. Extending from an entrance opening 203 to the opposite end of wall 198 of portion 197 is a spiral feed flight 204 which diminishes in height as it approaches end portion 197, as illustrated in Figs. 8 and 11. Spiral feed flight 204 comprises a short entrance flight 205 and the main flight 206. Welded between entrance flight 205 and the beginning of main flight 206 is a spider 207 that includes an opening 208 (Fig. 9) that is adapted to receive a drive shaft, and holes 211 that are adapted to be connected to a flanged bushing mounted on the drive shaft (see Fig. 23). Another spider 212 is welded to the other end of main flight 206. End portion 197 has foraminous wall 213, delivery opening 214 and is provided with a plurality of circumferentially spaced perforated buckets 215.

Figure 12:
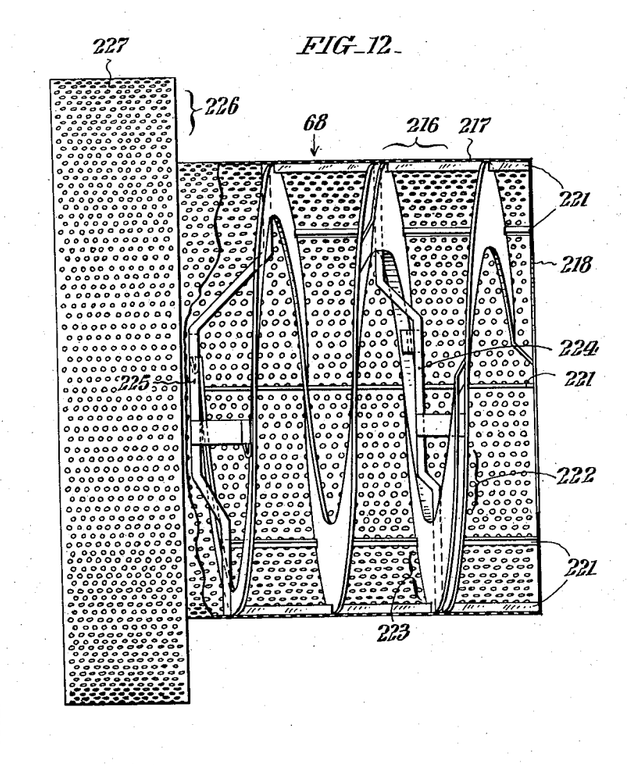
Fig. 12 represents a side view, partly in section, of a drum used in the lubricating unit of Fig. 1.
Figure 13:
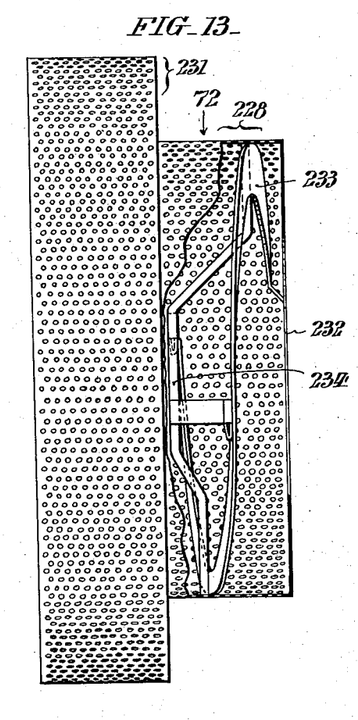
Fig. 13 represents a side view, partly in section, of a drum used in the rinse units of Fig. 1.
Figure 23:
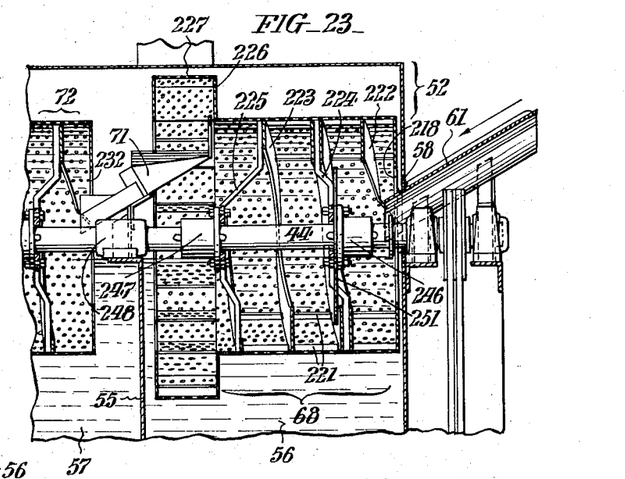
Fig. 23 is a sectional view in elevation of the drum portions of the wash and first hot rinse units of Fig. 1.

As is shown in Fig. 12, wash drum 68 has a small end portion 216 having a foraminous wall 217 and entrance opening 218, lifters 221, entrance flight 222, main flight 223, spiders 224 and 225, and a larger end portion 226 with a foraminous wall 227 having buckets and a delivery opening similar to those of pickling drum 77. Rinse unit drum 27, as is shown in Fig. 3, includes a small diameter portion 228, a larger diameter portion 231 with a cylindrical wall of foraminous material, and has an entrance opening 232, a spiral feed flight 233 and a spider 234. Fig. 23 illustrates in detail how the drums are mounted on shafts 44 and 47. The wash unit drum 68 receives the loading chute 61 through its entrance opening 218. Spider 224 is bolted to a flanged bushing 246 which is keyed to shaft 44, and spider 225 is bolted to a flanged bushing 247 which is also keyed to shaft 44. A bearing 248 is mounted on top of dam 55. Drum 68 is also provided with an annular deflection plate 251 which is bushed intermediate spider 224 and flange 246.

Figure 14:
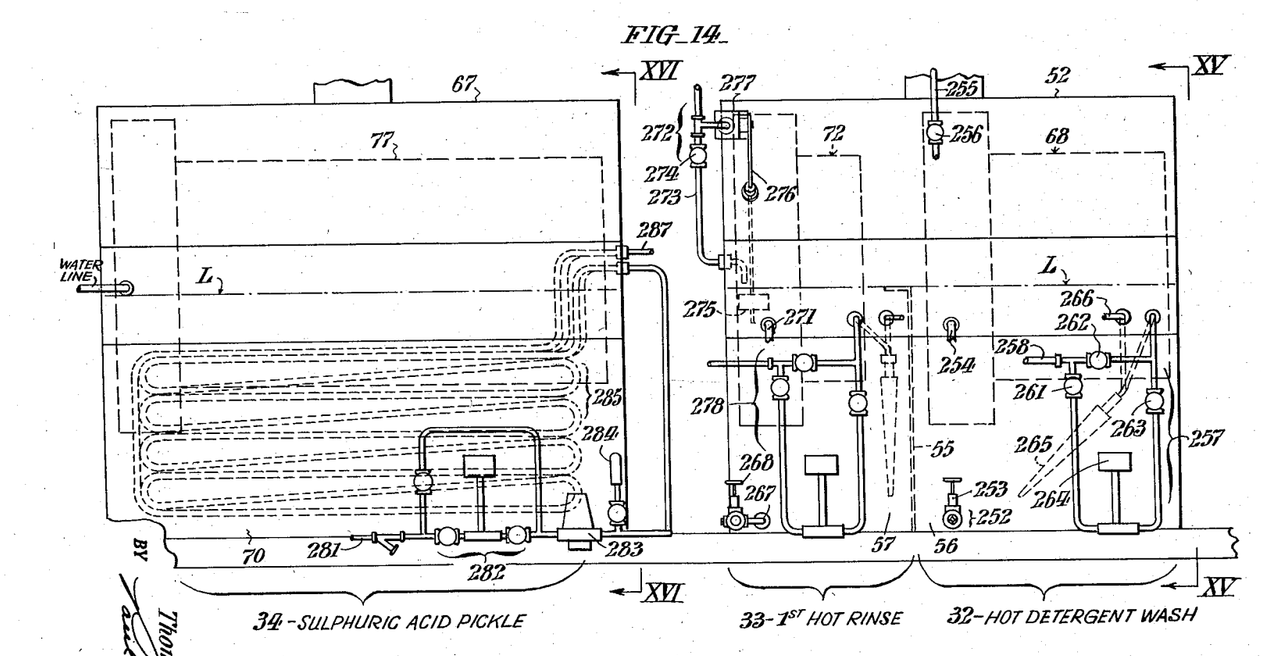
Fig. 14 is a view in front elevation on an enlarged scale and showing important details of the wash, first hot rinse and pickling units of Fig. 1.

Referring to Fig. 14, which is a somewhat diagrammatical view of wash unit 32, first hot rinse unit 33 and pickling unit 34 on a larger scale and in more detail as to the piping, it is seen that wash unit 32 is provided with a drain 252 and valve 253, an overflow pipe 254, a tank fill and level control pipe 255, and valve 256. Also provided is a fluid heating mechanism 257 including a steam inlet pipe 258, valves 261, 262 and 263, temperature controller 264, heating coil plate 265 and a steam outlet pipe 266. Rinse unit 33 is provided with a drain 267 having a valve 268, an overflow pipe 271 and a tank fill and level control mechanism 272 which includes pipe 273, valve 274, float 275, rod 276 and a Clayton level control diaphragm mechanism 277. Unit 33 is also provided with a fluid heating mechanism 278 which is similar to fluid heating mechanism 257 of unit 32.

Unit 34 is provided with a heating system that includes steam inlet pipe 281, steam heating control 282, steam pressure reducer 283, relief valve 284, double coils 285 and 286, and steam outlet pipes 287. The level of the liquid in units 32, 33 and 34, and in all of the units is indicated by the letter L.

Figure 15:
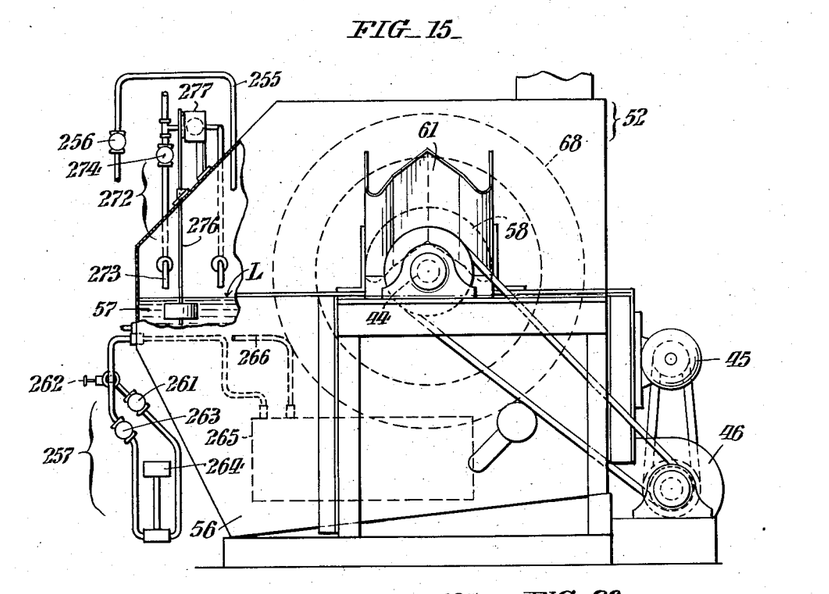
Fig. 15 is an end view taken as indicated by the lines and arrows XV—XV which appear in Fig. 14.
Figure 16:
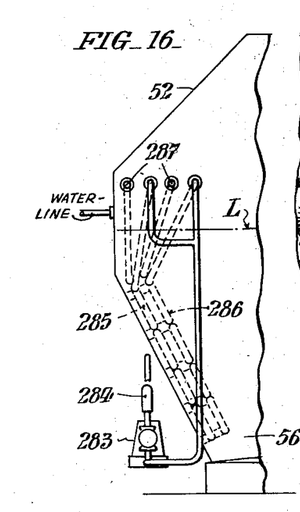
Fig. 16 is a partial end view taken as indicated by the lines and arrows XVI—XVI which appear in Fig. 14.

Fig. 15 is an end view of wash unit 32 and shows the construction of loading chute 61 which straddles drive shaft 44, the drive mechanism and the piping units, while Fig. 16 shows an end view of the double coils 285 and 286 of pickling unit 34.

Figure 17:
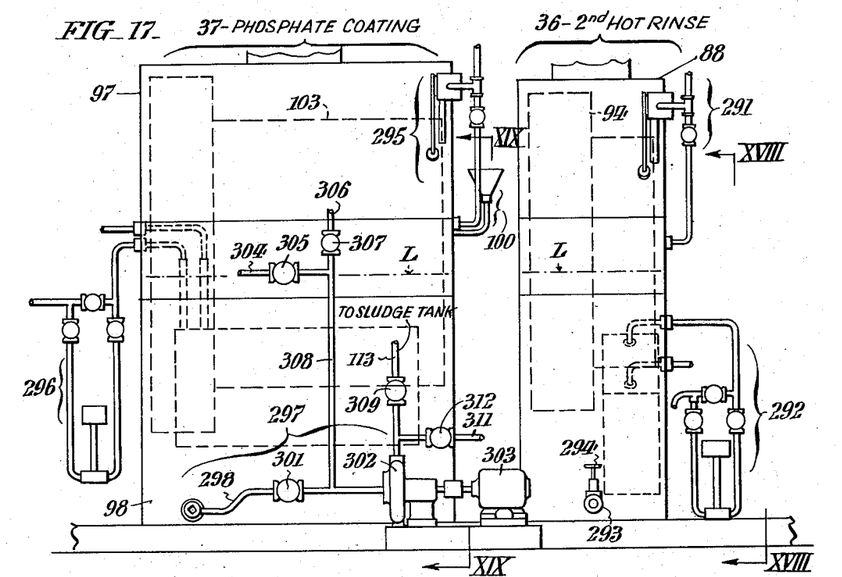
Fig. 17 is a view in front elevation on an enlarged scale and showing important details of the second hot rinse unit and the phosphate coating unit of Fig. 1.

Referring to Fig. 17, second hot rinse unit 36 is provided with a tank fill and level control unit 291 which is similar to control unit 272 of first hot rinse unit 33, with a fluid heating control mechanism 292 which is similar to mechanism 257 of wash unit 32, and with a drain 293 and valve 294.

Phosphate coating unit 37 is provided with a tank fill and level control unit 295 similar to the control unit 272 of rinse unit 33, and a fluid heating control mechanism 296 similar to mechanism 257 of wash unit 32. Also provided is an integral piping and pump system 297 for transferring fluid from phosphate tank 98 to sludge tank 106. System 297 is adapted for transferring the fluid continuously at a reduced rate of flow or for transferring a sizable quantity of the fluid by batch. System 297 provides means for settling out the solids normally formed in any zinc phosphate coating bath, decanting the clean solution and returning it to the phosphate tank 98. Included in system 297 are a tank outlet pipe 298, having valve 301, which connects with a pump 302 that is driven by a motor 303. A steam hose 304, having a valve 305, connects to a water inlet pipe 306, having a valve 307, that primes pump 302. Hose 304 and pipe 306 join to form pipe 308 which connects to pipe 298. Leading from pump 302 is the pipe 113 having a valve 309, that extends to sludge tank 106. A steam hose 311, having a valve 312, connects to pipe 113.

Figure 18:
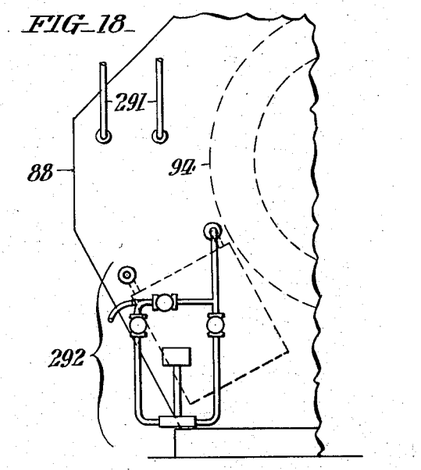
Fig. 18 is a partial end view taken as indicated by the lines and arrows XVIII—XVIII which appear in Fig. 17.
Figure 19:
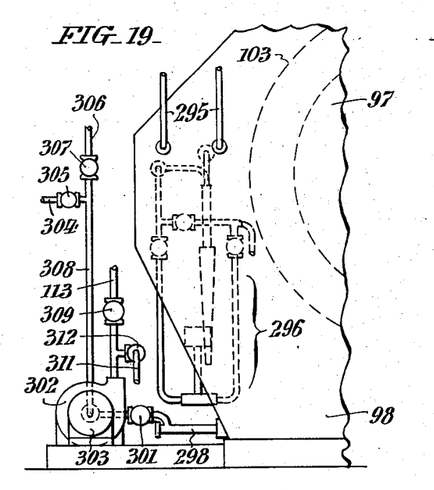
Fig. 19 is a partial end view taken as indicated by the lines and arrows XIX—XIX which appear in Fig. 17.

Fig. 18 is a partial end view of unit 36 showing the piping arrangement, and Fig. 19 is a partial end view of unit 37 which shows the piping arrangement of that unit.

Figure 20:
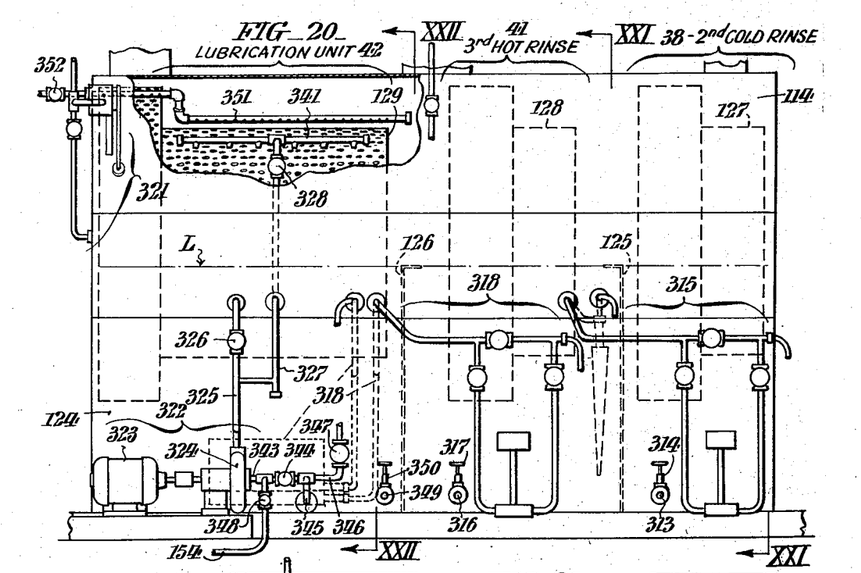
Fig. 20 is a view in front elevation on an enlarged scale and illustrating important details of the lubricating unit of Fig. 1 with its associated hot rinse and cold rinse units.

As is shown in Fig. 20, second cold rinse unit 38 is provided with drain 313 having a valve 314, and hot rinse unit 41 has a fluid heating mechanism 315 similar to mechanism 257 of unit 32. Unit 41 is also provided with a drain 316 having a valve 317. A fluid heating mechanism 318, similar to mechanism 257 of unit 32, is provided for lubricating unit 42.

Unit 42 is also provided with a level control mechanism 321 similar to the mechanism 272 of unit 33. Additionally, unit 42 is provided with integral piping and pump means 322 for recirculating the soap type lubricant. Means 322 includes a motor 323, a pump 324, a pipe 325 extending from pump 324 into tank 124 and including a valve 326 for delivering the lubricant directly to tank 124 below the surface of a lubricant contained in the tank. Connected to pipe 325 below valve 326 is a pipe 327 having a regulating valve 328 which connects with a horizontal pipe 341 having a series of nozzles which is positioned to direct a spray of lubricant toward the drum 129. The intake side of pump 324 is connected to a pipe 343, having a valve 344, which is connected to a pipe 345 that connects with tank 124. Pipes 343 and 345 also connect with a pipe 346, having a valve 347, which is connected to a source of steam. Between pump 324 and valve 344, pipe 345 is connected to pipe 154, having a valve 348, which leads to lube mixing tank 153. The operation of means 322 is as follows. If it is desired to spray the lubricant, valve 348 is turned on and valve 326 is shut off; if it is desired to pass the lubricant directly to the tank 124 below the surface of the lubricant contained therein, valve 328 is closed and valve 326 is opened. To transfer lubricant from the mixing tank 153 to the tank 124, valve 344 is closed and valve 348 is opened. To recirculate the lubricant in tank 124, valve 348 is closed and valves 344 and 347 are opened. Also provided for tank 124 is a drain 349 with valve 350.

Figures 21, 22:
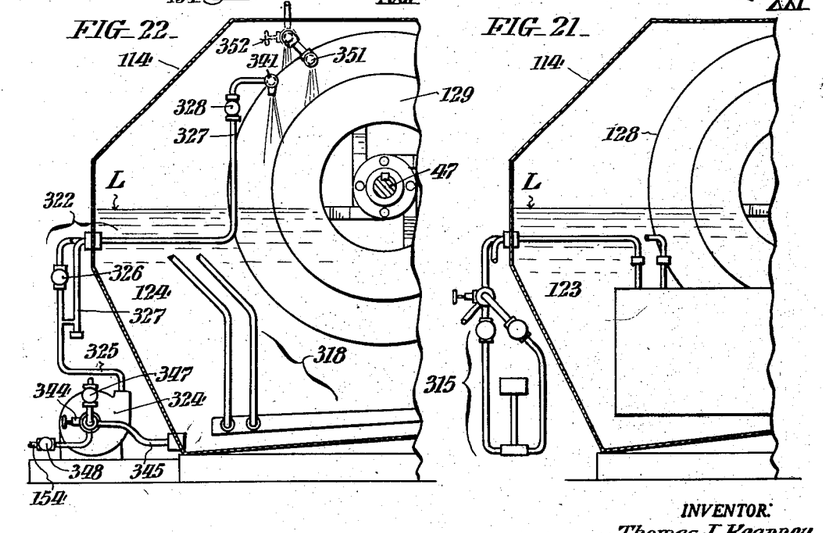
Fig. 21 is a partial view in section taken as indicated by the lines and arrows XXI—XXI which appear in Fig. 20.
Fig. 22 is a partial view in section taken as indicated by the lines and arrows XXII—XXII which appear in Fig. 20.

Fig. 21 illustrates the fluid heating mechanism 315 of unit 42, and Fig. 22 illustrates part of the heating means and pumping means 322 of unit 42.

Also provided in unit 42, as is shown in Figs. 20 and 22, is a steam spray pipe 351 which is positioned above drum 129 and is connected to a source of steam and controlled by a valve 352.

Figure 24:
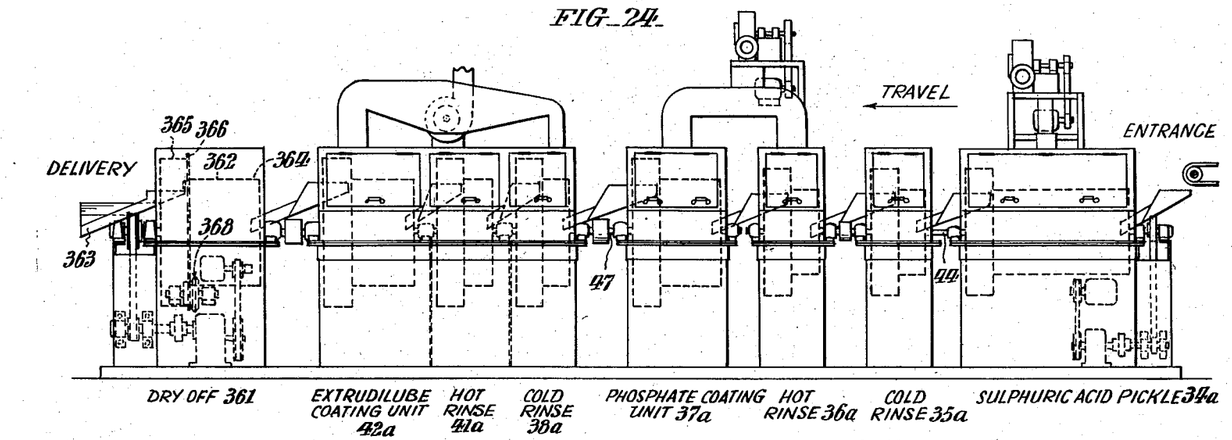
Fig. 24 is a view in front elevation of apparatus constructed in accordance with a modification of this invention.
Figure 25:
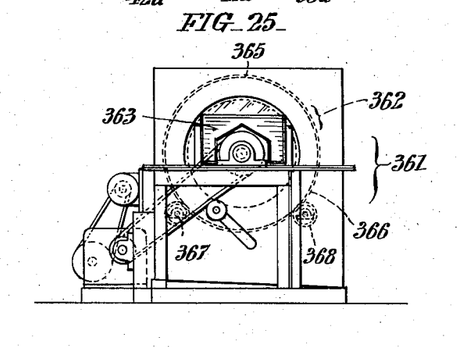
Fig. 25 is an end view in elevation of the apparatus of Fig. 24.

Fig. 24 illustrates a modification of the invention wherein is provided a pickling unit 34a, cold rinse unit 35a, hot rinse unit 36a, coating unit 37a, cold rinse unit 38a, hot rinse unit 41a, lubricating unit 42a and dryoff unit 361. Dryoff unit 361 is provided with a drum 362 and a delivery chute 363. Drum 362 is of similar construction as the drum illustrated in Fig. 8 having an end portion 364 of small diameter and an end portion 365 of larger diameter, but end portion 365 is provided with a flange 366 which rides on supporting rollers 367 and 368 which are illustrated in Fig. 25.

Figure 26:
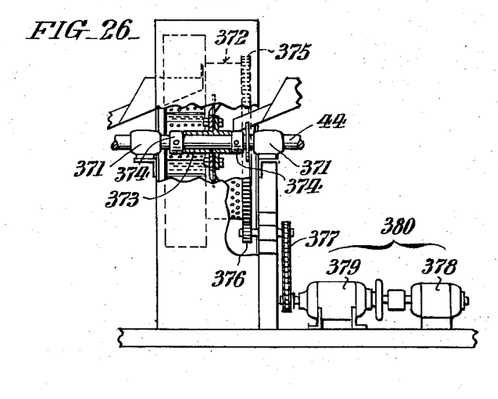
Fig. 26 illustrates apparatus constructed in accordance with another modification of this invention.

Fig. 26 illustrates another modification of the invention wherein is provided apparatus for increasing the speed of rotation of the drums in the rinse units for reducing the time that the slugs spend in the rinsing operation of the system. The common shaft 44 is supported by bearings 371 and drum 372 is mounted on a sleeve 373, between set collars 374, is freely rotatable about shaft 44. Drum 372 is provided with a toothed flange 375 that meshes with a sprocket 376 which is connected to drive means 380 including a chain 377, a motor 378 and a variable speed drive 379.

In operation, the slugs which have been loaded on an automatic handling device such as a conveyor belt are directed to the loading chute 61 and deposited in the first flight 222 of drum 68. The slugs are propelled away from the loading end towards the delivery end of drum 68 by spiral flights 222, 223, which are preferably seven inches high and have a pitch of eight inches. After the slugs have moved forwardly, being carried through the solution by the spiral screw action, they fall from the small diameter portion 216 of drum 68 into the large diameter portion 226 of the drum and are lifted out of the solution by means of the equally spaced perforated buckets, the conformation of which is shown in Fig. 8. As the drum revolves, the angle of the bucket lip goes past the angle of repose and the slugs are discharged into a transfer chute 71 which delivers the slugs into the succeeding drum 72. The slugs then, having been washed, are rinsed, pickled, subjected to a cold and then a hot rinse, coated with phosphate, subjected to a cold and then a hot rinse, coated with a lubricant, and deposited upon conveyor belt 148 of unit 43 where the slugs are dried and delivered to the delivery end of the apparatus. While passing through drying unit 43 the slugs are subjected to the heated air from nozzles 194 and 195 which aid in the drying action.

It has been found that slugs processed through this apparatus and following this method have proved highly satisfactory. This equipment has processed as high as 25,000 slugs per hour where the slugs have been ⅝" long by ⅝" in diameter. These slugs were later extruded into pieces ⅝" in diameter by 1¼" long and containing a cavity. This invention processes approximately 15,000 slugs per hour where the slugs are ⅞" in diameter by ⅞" long, which slugs are later to be extruded to ⅞" in diameter by 1⅞" long. This invention also processes approximately 5,000 parts per hour of pieces such as discs 4" in diameter by ³⁄₁₆" thick, which are later cold formed into practically semi-spheres 2¼" in diameter by 2" deep. The semi-spheres are again processed in this equipment and further extruded to a piece 2⅛" in diameter by 2¼" long.

It is to be understood that the form of the invention herein shown and described is to be taken as a preferred embodiment. Various changes may be made in the shape, size and arrangement of parts. Equivalent elements may be substituted for those described herein, parts may be reversed, and certain features of the invention may be utilized independently of the use of other features, all without departing from the spirit of the invention or the scope of the subjoined claims.

Having thus described my invention, I claim:

1. Apparatus for fluid treatment of metallic slugs or the like comprising a housing with a tank in the bottom thereof for the fluid, an open ended rotary drum supported within the housing and partly submerged in the fluid and having a loading end and a delivery end, a spiral feed flight positioned within the drum and operatively connected to the loading end of the drum, and circumferentially spaced lift flights positioned within the drum intermediate said feed flight and said delivery end and operatively connected with said feed flight and said delivery end, a delivery chute positioned adjacent said end, the lift flight portion of the drum being of larger diameter than the feed flight portion of the drum whereby to lift the treated slugs from the bottom of the drum to said delivery chute in one-half revolution of said drum.

2. Apparatus for fluid treatment of metallic slugs or the like comprising a first housing with a tank in the bottom thereof for the fluid, an open ended rotary drum supported within the housing and partly submerged in the fluid and having a loading end and a delivery end, a spiral feed flight positioned within the drum and operatively connected to the loading end of the drum, and circumferentially spaced lift flights positioned within the drum intermediate said feed flight and said delivery end and operatively connected with said feed flight and said delivery end; a second housing with a tank in the bottom thereof for the fluid, an open ended rotary drum supported within the housing and partly submerged in the fluid and having a loading end and a delivery end, a spiral feed flight positioned within the drum and operatively connected with said feed flight and said delivery end; and a transfer chute positioned between the delivery end of the drum of the first housing and the loading end of the drum of the second housing for transferring said slugs from the first housing to the second housing; said drums being mounted on and driven by a single shaft positioned above the level of the liquid in the tank; whereby the lift flights of said first drum lift the treated slugs from the bottom of the drum to the transfer chute in one-half revolution of the drum.

3. For use in apparatus for fluid treatment of metallic slugs or the like, apparatus for applying a coating of lubricant to said slugs comprising a housing with a tank in the bottom thereof for the lubricant, an open ended rotary drum supported within the housing and partly submerged in the lubricant, said drum having a foraminous wall and a loading end and a delivery end, means positioned within said drum for passing said slugs through the drum from the loading end to the delivery end, nozzle means positioned outside said drum for spraying said drum with lubricant, and for spraying lubricant through its foraminous walls, means for recirculating the tank lubricant and for supplying the tank with new lubricant, and means adjacent said nozzle means for contacting said drum with steam.

4. For use in apparatus for fluid treatment of metallic slugs or the like, said apparatus including a series of drums mounted for rotation on a common shaft, the variable speed drum apparatus comprising an open ended rotary variable speed drum supported within a housing and partly submerged in the fluid, said variable speed drum having a foraminous wall and a loading end and a delivery end, means positioned within said drum for passing said slugs through said variable speed drum from the loading end to the delivery end, means positioned within said drum adjacent its delivery end for lifting the slugs from the bottom of the drum to the top in one-half revolution of the drum, a sleeve positioned around said common shaft and freely rotatable thereon with said variable speed drum being mounted on said sleeve, a toothed flange mounted on said variable speed drum, and variable speed drive means for driving said toothed flange and said variable speed drum.

5. Apparatus for fluid treatment of metallic slugs or the like comprising a housing with a tank in the bottom thereof for the fluid; an open ended rotary drum horizontally supported within the housing and running partly submerged in the fluid, said drum having an end portion of small diameter with a spiral feed flight internally thereof, and an end portion of larger diameter with circumferentially spaced lift flights internally thereof; a loading chute by way of which the slugs are fed into the small end portion of the drum; and a delivering chute extending into the large end of the drum to receive the slugs elevated thereto by the lift flights; whereby said slugs are lifted from the bottom of the drum to said delivery chute in one-half revolution of the drum.

6. Apparatus for fluid treatment of metallic slugs or the like comprising a plurality of housed units constructed in accordance with claim 5 for different fluids, the drum of the units being serially connected for rotation in unison, with the delivery chute of one unit discharging into the small end of the drum in the next unit.

7. Apparatus for continuous fluid treatment of metallic slugs or the like in order to prepare said slugs for cold extrusion, said apparatus comprising in combination, means for pickling said slugs, means for rinsing the pickled slugs, means for applying a phosphate coating to said slugs, means for rinsing the coated slugs, means for applying a lubricating coating to the phosphate coated slugs, a series of delivery chutes with a chute positioned between said pickling means and said rinsing means, a chute positioned between said rinsing means and said phosphate coating means, a chute positioned between said phosphate coating means and said rinsing means, a chute positioned between said rinsing means and said lubricating means, and a chute positioned at the delivery end of said lubricating means, each of said means being provided with a rotatable drum having a spiral feed flight positioned therein for transporting the slugs through the drum, and circumferentially spaced lift flights positioned within the drum between the spiral feed flights and the delivery end of the drum for lifting the treated slugs from the bottom of the drum to its adjacent delivery chute in one-half revolution of the drum.

8. Apparatus for fluid treatment of metallic slugs or the like, comprising a housing with a tank in the bottom thereof for fluid, an open ended rotary drum supported within the housing and partly submerged in the fluid and having a loading end and a delivery end, a spiral feed flight positioned within the drum and operatively connected to the loading end of the drum, circumferentially spaced lift flights positioned within the drum intermediate said feed flight and said delivery end, a delivery chute positioned adjacent said delivery end, the lift flight portion of the drum being of larger diameter than the feed flight for supportion of the drum whereby to lift the treated slugs from the bottom of the drum to said delivery chute in one-half revolution of said drum, drying apparatus positioned at the delivery end of said chute, said drying apparatus comprising in a housing, an endless open mesh conveyor belt positioned within said dryer housing, a series of upper nozzles located within said dryer housing and positioned above said belt, a series of lower nozzles located within said dryer housing and positioned intermediate the upper and lower courses of said belt and directed toward said upper course, means for providing said nozzles with air at increased velocity, and means for heating said air with steam.

References Cited in the file of this patent

UNITED STATES PATENTS

| | | |
|---|---|---|
| 1,290,952 | Finlay et al. | Jan. 14, 1919 |
| 1,383,418 | Needham | July 5, 1921 |
| 1,465,071 | Baker | Aug. 14, 1923 |
| 1,573,340 | Weitman | Feb. 16, 1926 |
| 1,651,390 | Hersman | Dec. 6, 1927 |
| 1,978,050 | Johnson | Oct. 23, 1934 |
| 2,106,706 | Gordon | Feb. 1, 1938 |
| 2,377,964 | Ransohoff | June 12, 1945 |
| 2,415,738 | Freund | Feb. 11, 1947 |
| 2,516,884 | Kyame | Aug. 1, 1950 |
| 2,588,625 | Ferner et al. | Mar. 11, 1952 |
| 2,733,999 | Rodman | Feb. 7, 1956 |